US007682143B2

(12) United States Patent
Hansen et al.

(10) Patent No.: US 7,682,143 B2
(45) Date of Patent: Mar. 23, 2010

(54) MODULAR MOUNTING DEVICE FOR CONCRETE CASTING MACHINES

(75) Inventors: Erik Spangenberg Hansen, Østbirk (DK); Jesper Bjørn Rasmussen, Brabrand (DK); Kjeld Sejrup, Karup (DK)

(73) Assignee: KVM Industrimaskiner A/S, Kjellerup (DK)

( * ) Notice: Subject to any disclaimer, the term of this patent is extended or adjusted under 35 U.S.C. 154(b) by 169 days.

(21) Appl. No.: 11/887,035

(22) PCT Filed: Mar. 23, 2006

(86) PCT No.: PCT/DK2006/000165

§ 371 (c)(1),
(2), (4) Date: Oct. 15, 2007

(87) PCT Pub. No.: WO91/08091

PCT Pub. Date: Jun. 13, 1991

(65) Prior Publication Data

US 2009/0038488 A1 Feb. 12, 2009

(30) Foreign Application Priority Data

Mar. 23, 2005 (DK) .............................. 2005 00428

(51) Int. Cl.
*B29C 43/32* (2006.01)

(52) U.S. Cl. ........................... 425/193; 249/71; 249/77; 425/255; 425/406; 425/421

(58) Field of Classification Search ................. 425/186, 425/193, 412, 421, 406, 468, 218, 255, 73; 249/69, 71, 72, 76, 77, 160
See application file for complete search history.

(56) References Cited

U.S. PATENT DOCUMENTS

| | | | | |
|---|---|---|---|---|
| 421,385 | A | 2/1890 | Chambers, Jr. | |
| 4,119,692 | A * | 10/1978 | Durinck | 264/71 |
| 4,395,213 | A * | 7/1983 | Springs et al. | 425/211 |
| 4,981,428 | A * | 1/1991 | Herring, Sr. | 425/253 |
| 5,643,616 | A | 7/1997 | Hess | |
| 5,685,233 | A * | 11/1997 | DeJean | 108/57.17 |
| 7,021,916 | B2 * | 4/2006 | Correia | 425/116 |
| 2003/0140916 | A1 | 7/2003 | Steckling | |
| 2006/0022112 | A1 * | 2/2006 | Ishler | 249/77 |

FOREIGN PATENT DOCUMENTS

| | | |
|---|---|---|
| DE | 8815262 | 3/1989 |
| DE | 9004234.4 | 9/1990 |
| DE | 10302693 | 6/2004 |
| WO | WO 91/08091 | 6/1991 |

* cited by examiner

*Primary Examiner*—Yogendra Gupta
*Assistant Examiner*—Emmanuel S Luk
(74) *Attorney, Agent, or Firm*—James Creighton Wray; Meera P. Narasimhan

(57) ABSTRACT

Mounting device for a flexible constructed retainer means for retention of a casting upper part in a concrete casting machine of the type which typically is used for the production of casting items in the form of concrete blocks for pavements and wall constructions. Typically, two or three fixer flutes (10) are applied for each casting upper part, the length of the fixer flutes are adapted the depth of the casting upper part. In the invention, a flexible mountable fixer flute (10) consisting of two identical halves (12) is described. When the height of these fixer flute-halves exceeds a certain height, spacers (14) are mounted by means of bolting. The design of the fixer flute (10) leaves a space where the forks of fork lift trucks can be passed through, thus using the fixer flutes to also lift the casting upper part.

15 Claims, 3 Drawing Sheets

MODULAR MOUNTING DEVICE FOR CONCRETE CASTING MACHINES

This application claims the benefit of Danish Application No. PA 2005 00428 filed Mar. 23, 2005 and PCT/DK2006/000165 filed Mar. 23, 2006, which are hereby incorporated by reference in their entirety.

FIELD OF THE INVENTION

The present invention relates to a mounting device for retention of the upper part of a casting equipment for concrete casting machines of the kind typically used for production of cast items in the form of concrete blocks for pavement and wall construction, and including a cellular lower part with upwards and downwards open cells, which define the desired basic form of the individual blocks, and a complementing upper part with an upper retainer plate that includes pressing pistons projecting downwards, and which pressing pistons are designed with lower thrust plates which fit with the respective underlying cells in the lower part and thereby are useful for downwards counter hold during the compression phase including ejection of the cast items from the cells, and where the upper part includes a modular structured superstructure which may be adapted to different machine types.

BACKGROUND OF THE INVENTION

The casting equipment is used in the way that the cellular lower part is placed on a casting board disposed upon a vibration table with the upper part lying in an elevated position above the lower part. A concrete supply vehicle is guided in along the upper side of the lower part in the space below the upper part, thus pouring concrete into the casting cells and filling these with concrete. After filling, the supply vehicle is drawn out, and the upper part is lowered until the said thrust plates hit the concrete surfaces in the respective casting cells. Then, the upper part is used as a multi-pressure piston for compressing the concrete mass in the individual casting cells; this occurs under strong vibration of the casting equipment for separating air from the concrete mass. Hereby, the cast items are compressed for the desired compact block form and uniform thickness. Subsequently, the upper part is retained at its final level relative to the lower part, and the lower part is acted on by force and elevated from the casting board, whereby the cast items, which, by the pressure maintained from the upper part, do not participate in this elevation, and will remain standing on the casting board during the decasting concerned. When the decasting has ended by the ejection of the lower part to a position, in which its underside is elevated to at least the level of the pressing plates of the upper part, the semi-solid cast items can be removed from the vibrating table by ejection after elevating the upper part, after which a new casting cycle may begin after lowering the bottom part to the casting board and elevating the upper part to its starting position.

Any design and height of concrete products which are cast in a concrete casting machine require special casting equipment. As the concrete casting machine, merely by changing the casting equipment, is able to produce another product, e.g. another shape or height of the concrete product, it is necessary that the casting equipment easily can be changed in the concrete casting machine. Equipment for a quick retention and letting go of the casting equipment in concrete casting machines exist, see for example DK 171 553 and the German utility model G 88 15 262.6.

From DE 90 04 234 U is known a box formed construction which detachably may be fastened to a casting upper part in a concrete casting machine by means of a locking device with a complementary locking element.

Traditionally, the upper part for these retention systems is supplied with a welded superstructure or different types of fittings which precisely fit one type/make of concrete casting machine. This means that these superstructures are especially designed for the individual concrete casting machine and cannot easily be changed to another type/make of concrete casting machine. Furthermore, other factors are also significant, e.g. the height of the superstructure also often varies depending on the different makes of concrete casting machines, and even the form varies depending on which product the form is designed to produce.

As mentioned in the prior art described above, the mounting of forms in concrete casting machines is typically carried out by means of hydraulic or pneumatic cylinders which retain the casting upper part against a heavy retainer plate in the concrete casting machine. In the casting upper part there are typically two or three slots or rows of fittings wherein "mushrooms" mounted on each cylinder trundle by means of hydraulic or pneumatic pressure in the cylinders retain the casting upper part in the machine.

One disadvantage by several of the existing types of superstructures is the material stress which occurs in the form during the production in connection with the welding process. This stress may, however, be removed by a subsequent cost-increasing heat-treatment process.

DESCRIPTION OF THE INVENTION

The invention describes a super structure for a casting upper part which includes new means for the production of the necessary guide grooves which are adapted transversely to the mushroom-cylinders in the concrete casting machine. These means may in one embodiment of the invention be constituted by several identical fixer flutes which are detachably retained to a top plate, preferably by bolt connections, as defined in claim 1.

Furthermore, the use of bolts involves that the individual elements rapidly and simply can be exchanged in the casting frame.

Furthermore, the placing of incoming spacers, here illustrated as three spacers, but different numbers occur in connection with different lengths of the fixer flutes, makes it possible for the forks of a fork lift truck exactly to be placed under the spacers and thereby lift and remove the casting upper part in a simple manner. In case the fixer flutes are so low that it is not necessary to mount spacers, the forks of the fork lift truck can alternatively be placed in the groove itself and thereby still be used to lift the casting upper part. The length of the spacers is adapted to exactly fit the individual concrete casting machine, as recited in claims 3 and 4.

The invention furthermore gives the possibility to vary the stiffness of the fixer flute-halves by changing the rounding radius of the two bends of each fixer flute-half, as set out in claim 2.

The said vibration dampening effect has the advantage that it is ensured that not all vibrations of the compression are transmitted to the supports of the concrete casting machine. By the slight flexibility inherent in the vibration dampening effect, it is at the same time also achieved that the casting upper part is able to slightly oscillate (vibrate) independently of the counter hold in the concrete casting machine, thus improving the compression and resulting in that the surfaces of the cast items will appear more smooth. The vibration dampening effect implies that the casting upper part is able to move slightly in relation to the counter hold in the concrete casting machine, and that the casting upper part is able to oscillate slightly different than the casting frame, further ensuring that the counter hold of the concrete casting machine is not subjected to quite so strong vibrations during the compression vibration, thus protecting the concrete casting machine.

As an alternative to the flexibility that depends on the rounding radius of the bend, the bent U-profile fixer flute-half can be replaced by a welded or cast U-profile fixer flute-half, or a complete fixer flute naturally, thus resulting in that the casting upper part is connected more stiffly to the counter hold of the concrete casting machine, this will typically be in connection with concrete casting machines with an integrated, adjustable and flexible counter hold structure.

The bending of U-profiles to fixer flute-halves is a simple process which is simple to quantity-produce. Similarly, the welding of U-profiles to fixer flute-halves is a simple longitudinal seem welding process. The casting of fixer flutes is also a simple and known technique; these aspects are set out in claims 6 and 7.

The fixer flute-halves can easily be changed in case of damage, as they are detachably retained by bolting.

In certain embodiments of the fixer flutes, they may advantageously, and with regard to the applied concrete casting machine, be designed with a relatively low height. Hereby, the extra reinforcement, which is created by the spacers functioning as lifting fittings for a fork lift truck in other embodiments, may in some cases be expendable. In the low embodiments, the upper bent parts of the fixer flute are used as lifting fittings for the fork lift truck, as set out in claim 3.

DESCRIPTION OF THE DRAWING

The invention is then described briefly with reference to the drawing, on which.

DETAILED DESCRIPTION OF THE INVENTION

Figure 1:
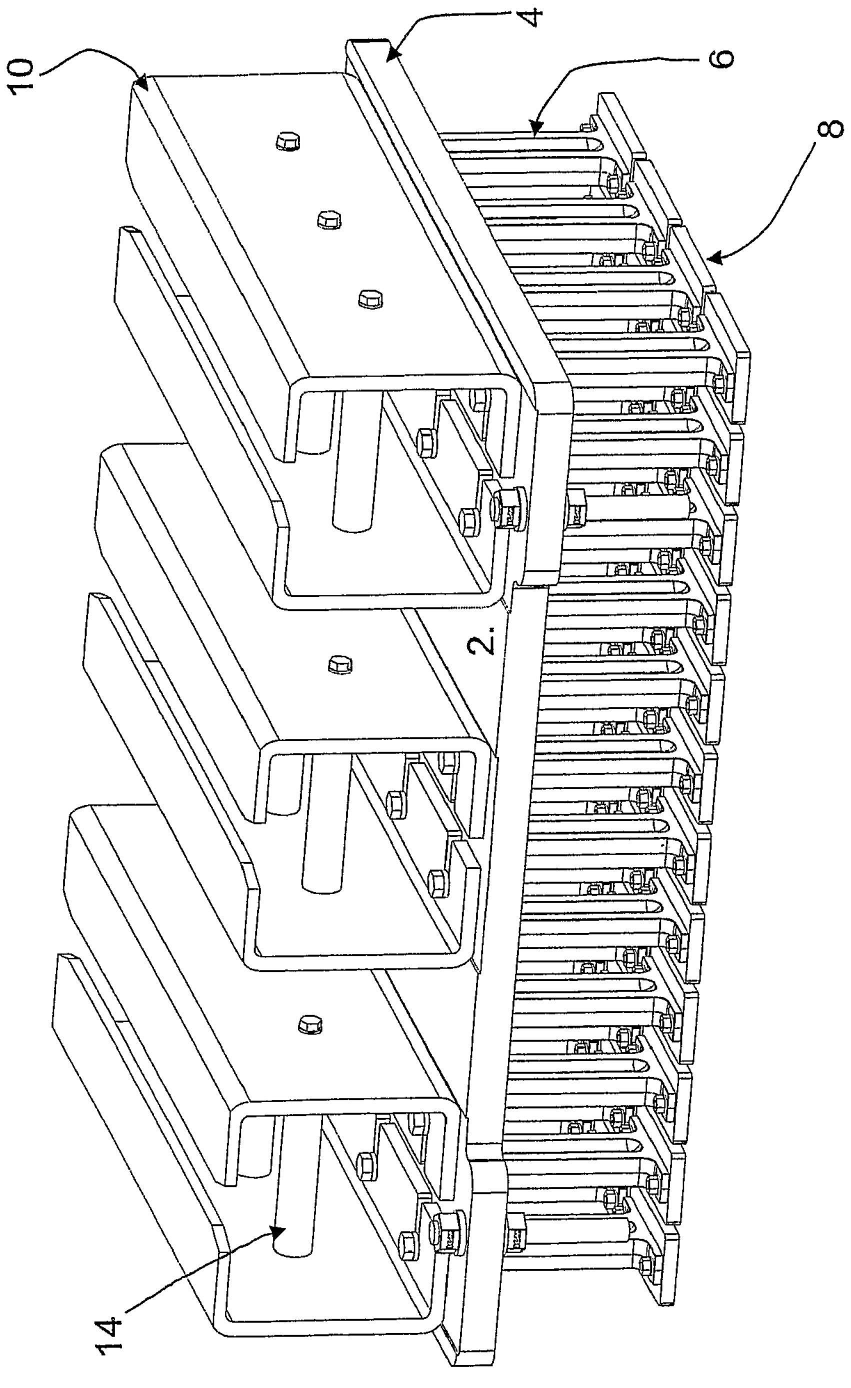
FIG. 1 is a perspective view of one embodiment of the invention, where the casting upper part includes the flexibly mountable flexible fixing flutes.

FIG. 1 illustrates a casting upper part (2) with flexible mountable fixer flutes (10). For the illustrated size of the casting upper part, three rows of fixer flutes (10) are used. The casting upper part (2) is build of a top plate (4). Extending downwards in the use situation, a number of thrust plate legs (6) corresponding to the number of casting cells arranged in the lower part of the casting form (not shown) are retained. The thrust plate legs (6) are placed in the end turning away from the top plate (4) which is provided with thrust plates (8) having a geometrical form corresponding to the form of the casting cells in the lower part. In this example, thrust plate legs (6) and thrust plate (8) are connected by means of a bolt connection, but also welding or another well-known method of assembling may be used as well as thrust plate and thrust plate legs can be designed as a cast item.

Figure 2:
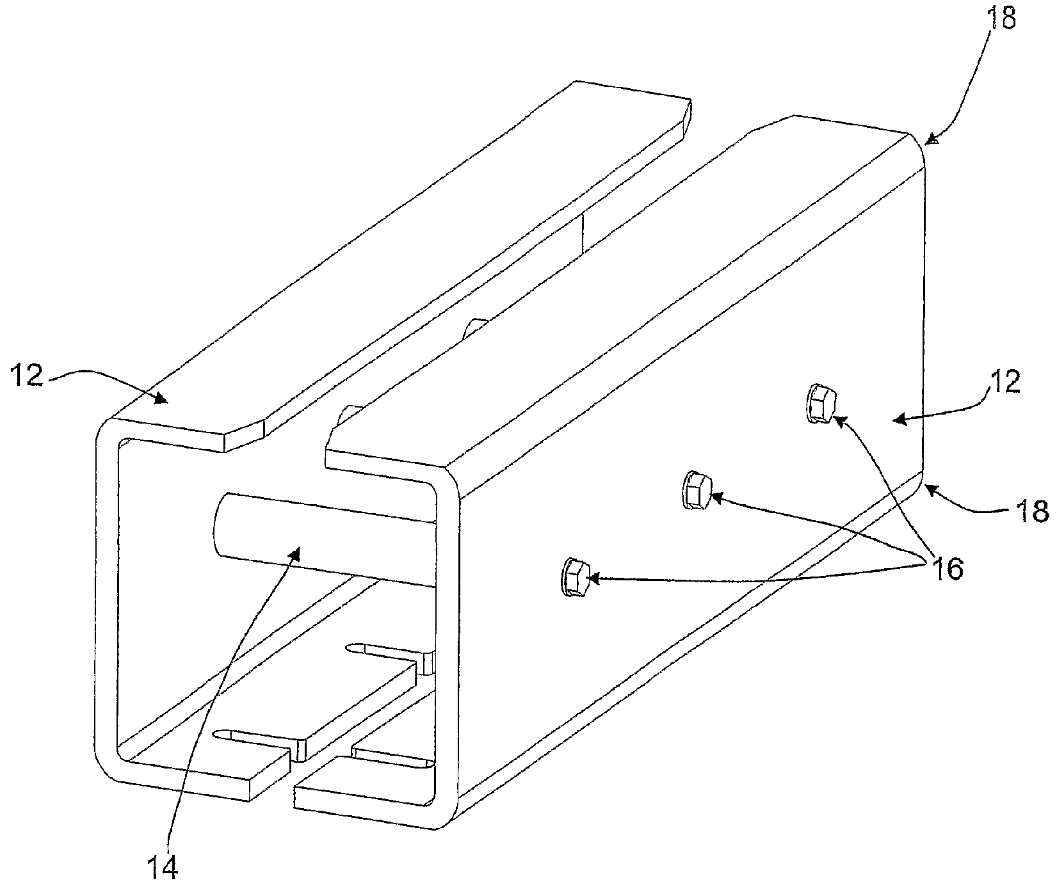
FIG. 2 is a perspective view of a flexible fixing flute comprising two fixer flute-halves and three spacers.

Each fixer flute (10) is structured as illustrated in FIG. 2. One of the great advantages of the invention is that the individual fixer flutes (10) may be placed individually and flexibly on the casting upper part (2). Hereby the casting upper part (2) can be adapted to co-operate with different concrete casting machines merely by means of the flexible mounting of one or more fixer flutes. Furthermore, it is also possible to change the placing of the individual fixer flutes (10) on the top plate (4) and thereby providing the possibility to adapt the upper part depending on which machine the casting upper part forms part of.

FIG. 2 illustrates an embodiment of the flexible mountable fixer flute comprising two mirrored halves (12) which are mutually connected with three spacers (14) which are bolted with six bolts (16). The placing of the spacers makes it possible to place a fork of a fork lift truck in the space between the two halves (12). Each half (12) has two bends (18), the radius of these bends may be varied, thereby providing the possibility of different vibration dampening characteristics of the fixer flutes. The upper and lower bends (18) will typically be identical for the incoming fixer flute halves for a casting upper part, but the upper bend radii may also be different from the lower bend radii.

Figure 3:
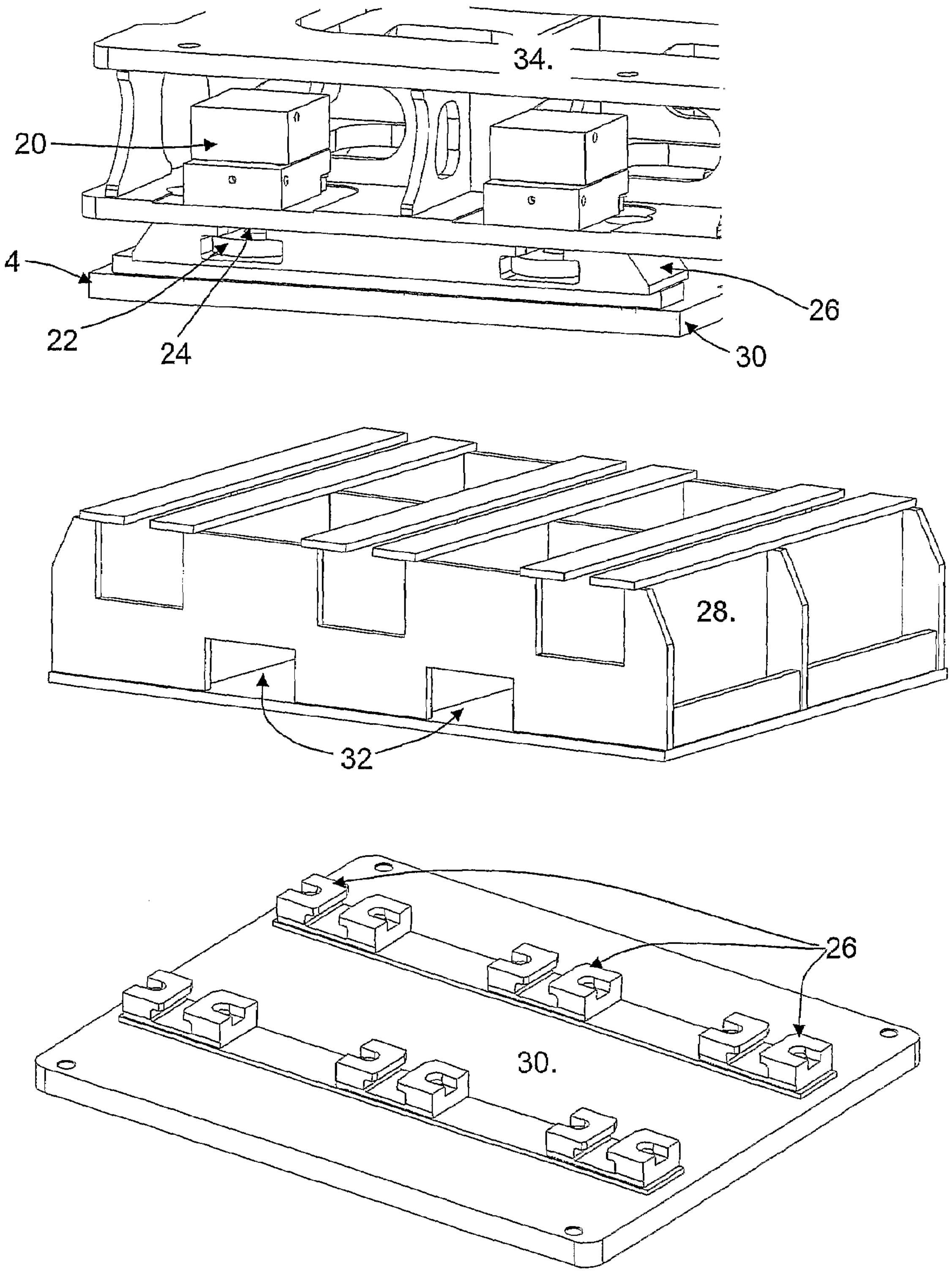
FIG. 3 shows some typical older ways of superstructures on casting upper parts.

FIGS. 3*a*-3*c* illustrate different former typical fittings and super structures to a casting upper part.

FIG. 3*a* illustrates a typical counter hold (34) with integrated retainer cylinders (20) which engages a casting upper part with retainer fittings (30). A retainer fitting (26) is here illustrated when mounted on a top plate (4) where the mushroom (22), which is mounted on the cylinder trundle (24), retains the casting upper part (30) to the counter hold (34) of the concrete casting machine.

FIG. 3*b* illustrates a typical welded structure (28) for a casting upper part where three grooves for retainer cylinders are provided and which cylinders may correspond to the cylinders described in FIG. 3*a*. Furthermore in the illustrated structure, there are also placed two openings/grooves for passing the forks of a fork lift truck.

FIG. 3*c* illustrates a second casting upper part with retainer fittings (30). It is illustrated with fittings (26) which are placed for three rows of retainer cylinders, e.g. retainer cylinders corresponding to FIG. 3*a*.

The casting upper parts are all illustrated without thrust plate legs and thrust plates. The casting upper part in FIG. 3*a* is only provided with two retainer grooves. The casting upper part in FIGS. 3*b* and 3*c* are provided with three retainer grooves.

LIST OF POSITION NUMBERS

- 2. Casting upper part
- 4. Top plate
- 6. Thrust plate legs
- 8. Thrust plate
- 10. Fixer flute
- 12. Fixer flute half
- 14. Spacer/lifting fitting for fork truck
- 16. Bolt
- 18. Rounding radius fixer on flute half
- 20. Retainer cylinder
- 22. Mushroom
- 24. Cylinder trundle
- 26. Retainer fitting
- 28. Casting upper part with superstructure with grooves
- 30. Casting upper part with retainer fitting
- 32. Grooves for forks of a fork lift truck
- 34. Retainer on concrete casting machine with integrated retainer cylinders

The invention claimed is:

1. Mounting device for securing casting upper parts (2) in concrete casting machines of the type which is typically used for production of casting items in the form of concrete blocks for pavements and wall constructions where the casting form includes a cellular lower part with upwards and downwards open cells which define the desired basic form of the individual concrete blocks, and a complementing upper part having thrust plate legs (6) extending down from the top plate and formed with lower thrust plates (8) which fit in the respective underlying cells in the lower part and thereby are useful for a downward ejection of the casting items from the cells, wherein the securing of the upper parts to the concrete casting machine is effected by one or more fixer flutes (10) consisting of two identical halves (12) which are detachably fastened to the casting upper part (2), and where the halves (12), depending on the height of the fixer flute, may mutually be connected with spacers (14), by bolt connections.

2. Mounting device according to claim 1, wherein each half of the fixer flute is substantially U-shaped comprising two parallel flanges connected by a body part where the transition from body part to a flange part defines a rounding and that the radius on the roundings (18) on the fixer flute-half (12) determines the vibration dampening effect of the entire fixer flute (10).

3. Mounting device according to claim 1 wherein in case of tall fixer flutes, the distance between the upper parts (2) and the concrete casting machine implies that the spacers (14) are disposed such that the forks of a fork lift truck can be passed through the fixer flutes (10), thereby constituting a secure point of attack for lifting the upper part.

4. Mounting device according to claim 1 wherein the distance, in case of low fixer flutes (10) where spacers are not necessary, is adapted such that the forks of a fork lift truck can be lead through the fixer flutes (10), thereby constituting a secure attack for lifting the upper part.

5. Mounting device according to claim 1 wherein the fixer flute itself is shaped as one continuous unit in which unit the necessary recesses, holes, etc. are provided to ensure the correct utilisation of the fixer flute.

6. Mounting device according to claim 4, wherein the fixer flute is produced as a rolled, welded and worked metal item.

7. Mounting device according to claim 5, wherein the fixer flute is designed as a cast metal item.

8. A mounting device for securing casting upper parts in concrete casting machines comprising casting forms including cellular lower parts with upward and downward open cells defining desired basic forms of individual concrete blocks and complementary upper parts comprising thrust plate legs extending downward from a top plate and formed with lower thrust plates for fitting in respective underlying cells in the cellular lower parts thereby enabling downward ejection of cast items from the cells, wherein the upper parts are secured to the concrete casting machine by one or more fixer flutes each fixer flute comprising two identical halves each detachably fastened to the casting upper part.

9. The mounting device of claim 8, further comprising one or more spacers for mutually connecting the two halves depending on the height of the one or more fixer flutes, and wherein the spacers are connected by bolt connections.

10. The mounting device of claim 8, wherein each half of each of the one or more fixer flutes is substantially U-shaped comprising two parallel flanges connected by a body part with opposing rounded transitions from the body part to the flange parts and wherein a radius on the rounded transition on the fixer flute-half determines a vibration dampening effect of the entire fixer flute.

11. The mounting device of claim 9, wherein the spacers are disposed in tall fixer flutes at distances between the upper parts and the concrete casting machine such that the forks of a fork lift truck pass through the one or more fixer flutes thereby constituting a secure point of attachment for lifting the upper parts.

12. The mounting device of claim 9, wherein in lower fixer flutes where spacers are not necessary the distance is adapted for the forks of a fork lift truck to be led through the fixer flutes thereby constituting a secure attachment for lifting the upper parts.

13. The mounting device of claim 8, wherein each fixer flute is shaped as one continuous unit comprising indications for correct utilization of the fixer flute.

14. Mounting device of claim 8, wherein each fixer flute is of a rolled, welded, and worked metal.

15. Mounting device of claim 8, wherein each fixer flute is of cast metal.

* * * * *